(12) United States Patent
Liu

(10) Patent No.: US 7,857,467 B2
(45) Date of Patent: Dec. 28, 2010

(54) PROJECTORS WITH SECURITY AREA DETECTION

(75) Inventor: Chin-Ku Liu, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 417 days.

(21) Appl. No.: 12/032,792

(22) Filed: Feb. 18, 2008

(65) Prior Publication Data

US 2009/0073390 A1 Mar. 19, 2009

(30) Foreign Application Priority Data

Sep. 14, 2007 (TW) .............. 96134476 A

(51) Int. Cl.
*G03B 21/26* (2006.01)
(52) U.S. Cl. .................. 353/122; 250/222.1
(58) Field of Classification Search .......... 353/122, 353/28; 250/221, 222.1
See application file for complete search history.

(56) References Cited

U.S. PATENT DOCUMENTS 5,117,221 A * 5/1992 Mishica, Jr. .............. 353/122
7,018,055 B2   3/2006 Suzuki
2006/0225352 A1* 10/2006 Fischer et al. .............. 49/49

FOREIGN PATENT DOCUMENTS

CN 1523439 8/2004
TW I232346 5/2005

OTHER PUBLICATIONS

CN Office Action mailed Jan. 8, 2010.
English translation of CN1523439, pub. Aug. 25, 2004.
English language abstract of TW I232346, published May 11, 2005.

* cited by examiner

*Primary Examiner*—Seung C Sohn
(74) *Attorney, Agent, or Firm*—Thomas, Kayden, Horstemeyer & Risley

(57) ABSTRACT

A projector comprising a light engine, a detector, and a control unit is disclosed. The light engine comprises a light source and generates a projection beam based on the light from the light source. The space which the projection beam passes through is defined as a projection area, and a security area is defined by the projector to include or overlap the projection area. The detector detects whether a living organism is in the security area or not. When the detector detects a living organism in the security area, the detector generates a warning signal and transmits the warning signal to the control unit. After receiving the warning signal, the control unit directs the projector to enter a security mode to protect the living organism from being hurt.

12 Claims, 3 Drawing Sheets

PROJECTORS WITH SECURITY AREA DETECTION

BACKGROUND OF THE INVENTION

1. Field of the Invention

The present invention relates to a projector and a safe operation method thereof.

2. Description of the Related Art

As the light source of the projector is high-powered, human eyes may be hurt by projection beams from the projector when the projection beams directly shining into the human eyes.

Conventional projectors do not protect human eyes from being hurt by the strong projection beams from the projector. Therefore a method for protecting users is required.

BRIEF SUMMARY OF THE INVENTION

In order to solve the above shortcomings, in one embodiment of the invention, a projector comprises a light engine, a detector and a control unit. The light engine comprises a light source, and generates a projection beam based on the light provided by the light source. The space which the projection beams pass through is defined as a projection area. A security area is defined by the projector to include or overlap the projection area. The detector is used for detecting whether a living organism is in the security area or not. When the detector detects a living organism in the security area, the detector generates a warning signal and transmits the warning signal into the control unit. After receiving the warning signal, the control unit directs the projector to enter a security mode.

In one embodiment of the invention, a method of safely operating the projector. The safe operation method comprises using the detector to detect whether a living organism is in the security area or not. The detector generates a warning signal when detecting a living organism being in the security area. After receiving the warning signal, the control unit directs the projector to enter a security mode.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "coupled," and variations thereof herein are used broadly and encompass direct and indirect connections, couplings, and mountings.

Figure 1:
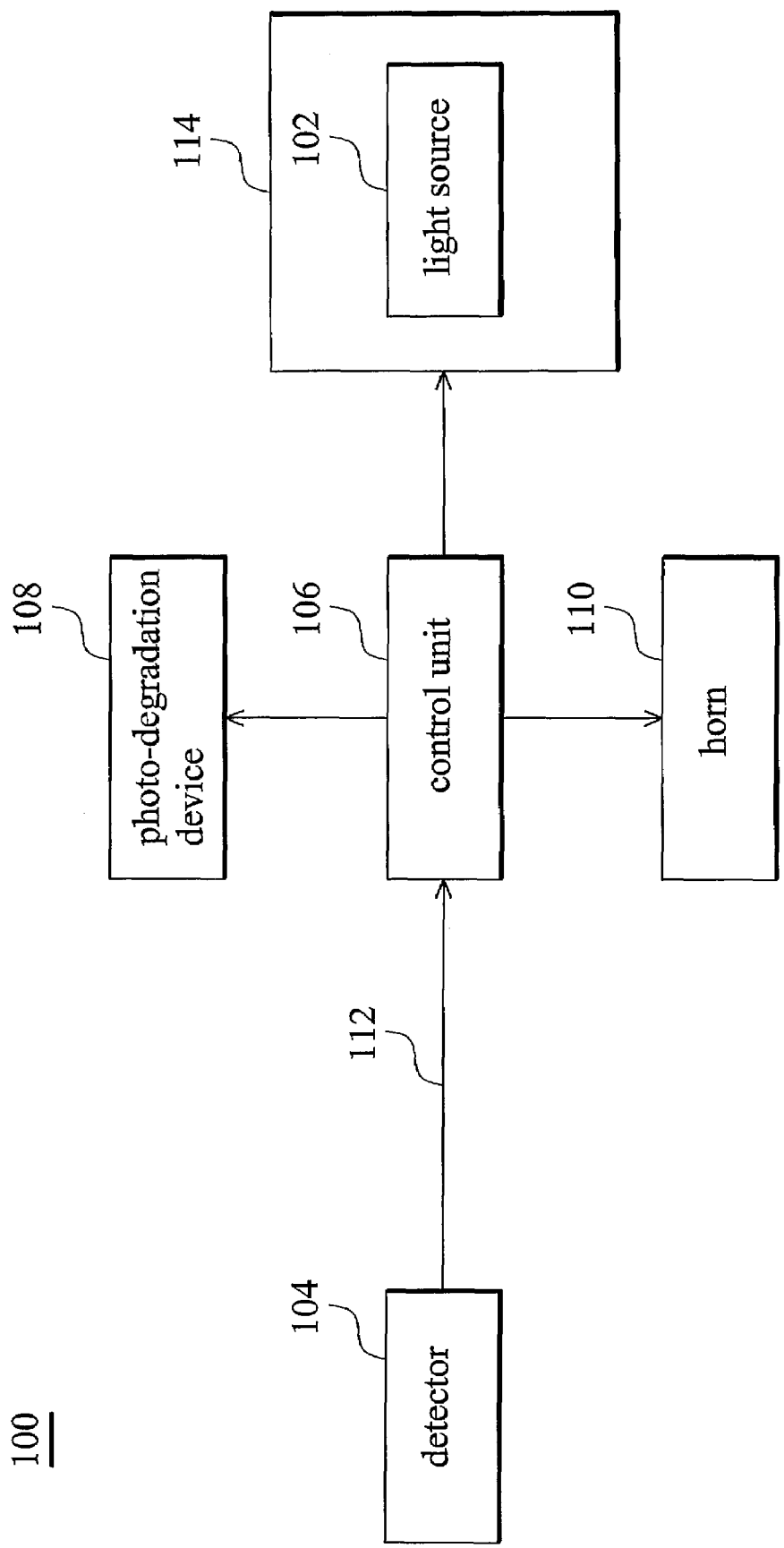
FIG. 1 illustrates a block diagram of a projector according to one embodiment of the invention.

FIG. 1 illustrates a projector in one embodiment of the invention. The projector 100 comprises a light engine 114, a detector 104 and a control unit 106. The light engine 114 comprises a light source 102. Based on the light provided by light source 102, the light engine 114 generates projection beams. The space which the projection beams pass through is defined as a projection area. A security area is defined by the projector 100 to include or overlap the projection area. The detector 104 detects whether a living organism is in the security area or not. When a living organism is detected in the security area, the detector 104 generates a warning signal 112 and transmits the warning signal 112 to the control unit 106. After receiving the warning signal 112, the control unit 106 directs the projector 100 to enter to a security mode to avoid hurting the living organism.

The detector 104 may be an infrared ray sensor or a face detection camera. The infrared ray sensor can distinguish organisms/items with temperature of 30° C.~40° C. The face detection camera can be implemented by a CCD camera comprising a CCD sensor and a face detection unit. The CCD sensor takes the picture of the security area and then transmits the picture to the face detection unit. The face detection unit is used for distinguishing if there is a human face in the security area to determine if there is a human in the security area.

The light source 102 may be a laser. Because the laser is immediately usable without warm-up, the control unit 106 can directly turn off the laser 102 when the detector 104 detects a living organism in the security area.

In another embodiment, the light source 102 is a high-pressure mercury lamp. Because the high-pressure mercury lamp requires a period of time to warm-up, which is time consuming, the projector further comprises a photo-degradation device 108. When the detector 104 detects a living organism in the security area, the control unit 106 controls the photo-degradation device 108 to degrade the light from the high-pressure mercury lamp (102).

In another embodiment, the projector 100 further comprises a horn 110. When the detector 104 detects a living organism in the security area, the control unit 106 sounds the horn 110 to warn the living organism.

Figure 2:
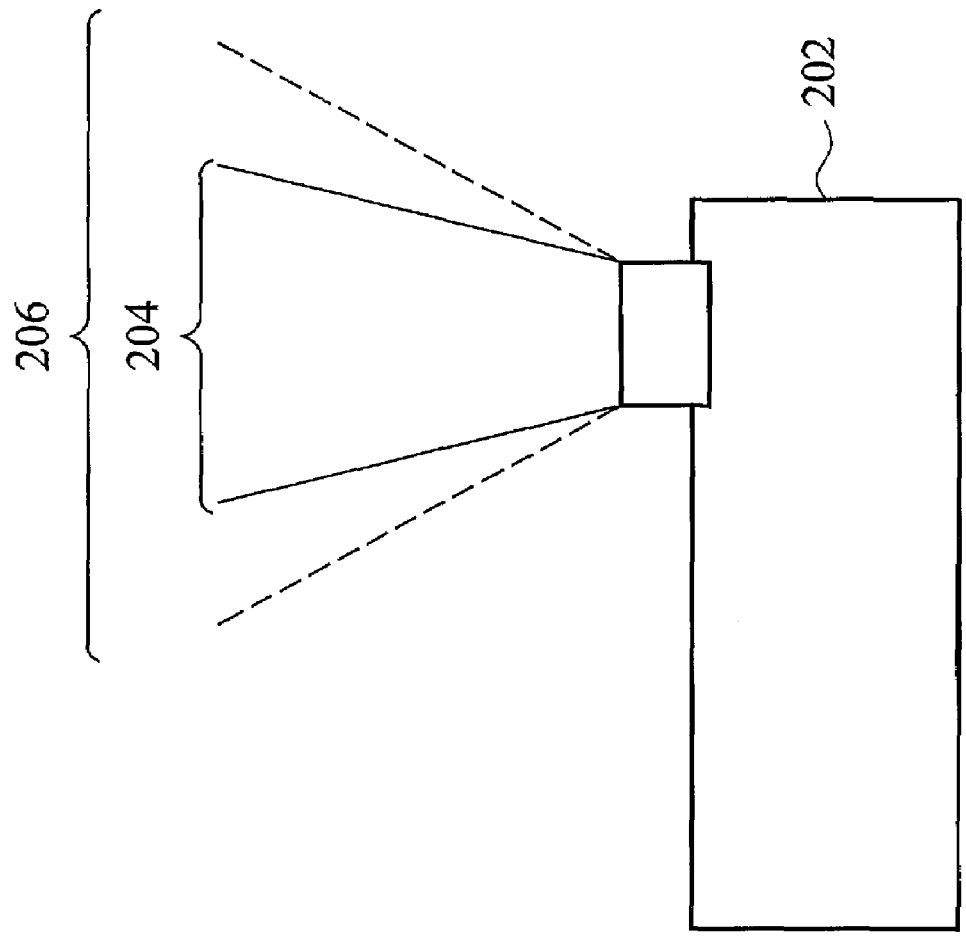
FIG. 2 illustrates a diagram of a projection area and a security area according to one embodiment of the invention.

In some embodiments, the security area is designed to be wider than the projection area (as that shown in FIG. 2). The projection of the projector 202 may be projected in the projection area 204. It is dangerous to stand within the projection area since the projection beams may hurt human eyes. As the embodiment shows in FIG. 2, a security area 206 is designed wider than the projection area 204 so that the projector 202 can warn organisms in the security area before he/she enters the projection area. In this embodiment the projector comprises a horn 110 and the light source 102 is a laser, the control unit 106 sounds the horn 110 when the detector 104 detects a living organism being in the security area 206 and, when the detector 104 detects the living organism being in the projection area 204, the control unit 106 directly turns off the laser. In another embodiment the projector comprises a horn 110 and the light source 102 which is a high-pressure mercury lamp, the control unit 106 sounds the horn 110 when the detector 104 detects a living organism being in the security area 206 and, when the detector 104 detects the living organism being in the projection area 204, the control unit 106 uses the photo-degradation device 108 to degrade the intensity of the light from the high-pressure mercury lamp.

One embodiment of the invention further provides a method of safely operating the projectors. The block diagram of the projector is shown in FIG. 1, which comprises a light engine 114, a detector 104 and a control unit 106. The light engine 114 comprises a light source 102. According to the light from the light source 102, the light engine 114 generates projection beams. The space which the projection beams pass through is defined as a projection area. A security area is defined by the projector to include or overlap the projection area.

Figure 3:
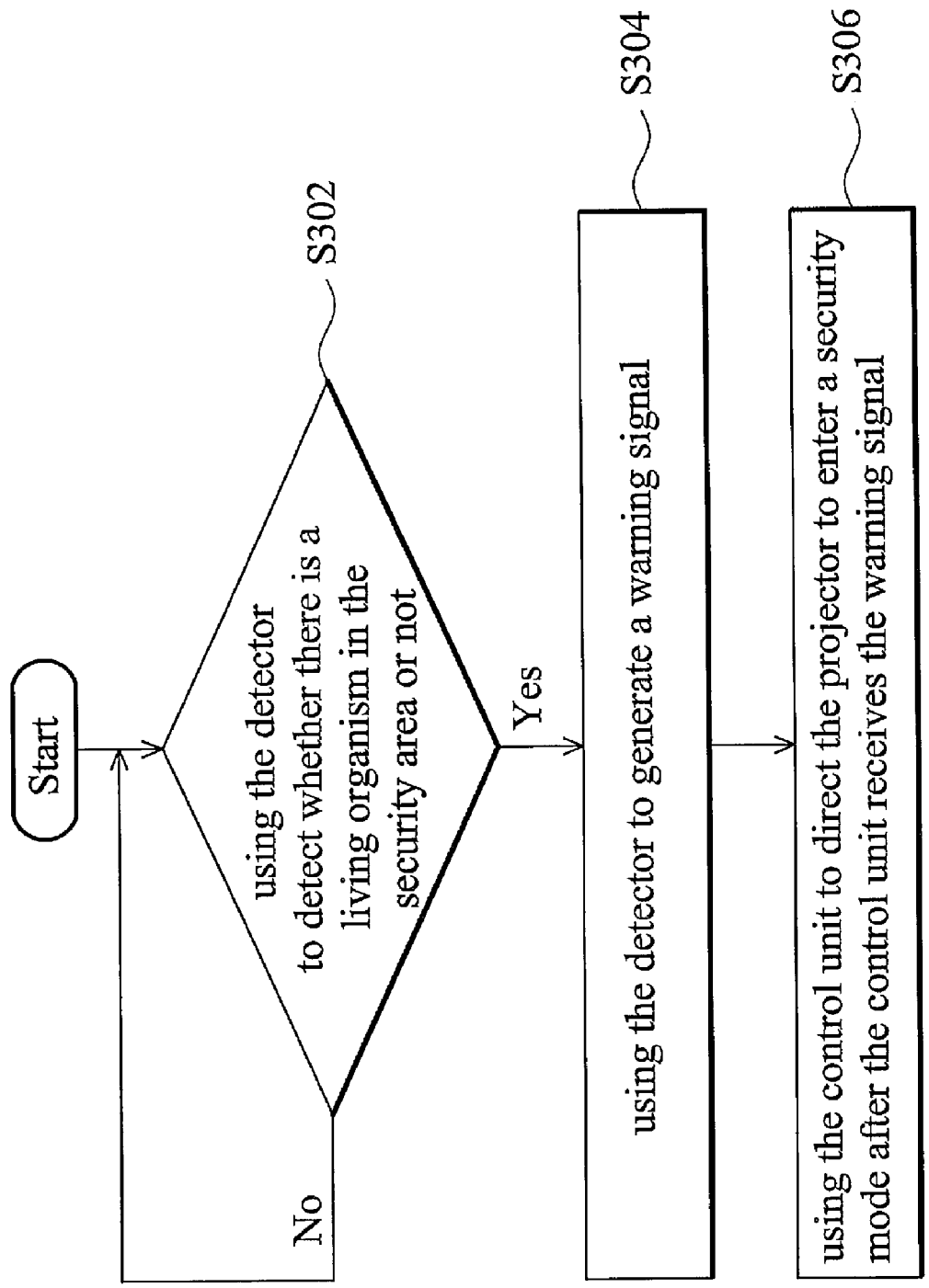
FIG. 3 illustrates a flowchart of a safe operation method according to one embodiment of the invention.

FIG. 3 illustrates the flowchart of the safe operation method in one embodiment of the invention. In step S302, the detector 104 is used for detecting whether a living organism in the security area or not. When the detector 104 detects a living organism in the security area, step S304 is executed. In step S304, the detector 104 generates a warning signal and transmits the warning signal to the control unit 106. In step S306, the control unit 106 directs the projector to enter a security mode after receiving the warning signal. When the detector 104 detects no living organism in the security area, the method repeats step S302 to continue detecting the security area. The detector 104 may be an infrared ray sensor or a face detection camera.

In an embodiment of the projector includes a laser as the light source, the safe operation method directly turns off the laser in the security mode. In another embodiment of using a high-pressure mercury lamp as the light source, the safe operation method provided provides a photo-degradation device and uses the photo-degradation device to degrade the intensity of light from the light source in the security mode.

The safe operation methods in some embodiments of the invention further comprises a horn for sounding when the detector detects a living organism in the security area.

The safe operation methods in some embodiments of the invention design the security area to be wider than the projection area (as that shown in FIG. 2). In these embodiments, the safe operation method comprises sounding the horn when the detector detects a living organism entering the security area 206 and degrading the intensity of the light provided by the light source when the detector detects the living organism entering the projection area 204. In an embodiment of the invention, the projector includes a laser as the light source, the intensity of the light provided by the light source (laser) can be degraded by directly turning off the laser. In another embodiment of the invention, the projector includes a high-pressure mercury lamp as the light source, the intensity of the light provided by the light source (high-pressure mercury lamp) can be degraded by a photo-degradation device.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector circuit board, comprising:
   an image receiving terminal, receiving an image signal;
   a central processing unit, processing the received image signal;
   a motor driving module, rotating a color wheel on the basis of the processed image signal to generate a colored beam;
   a Digital Micro-mirror Device, comprising a plurality of micro-mirrors, reflecting the colored beam, modulating the colored beam into an image beam on the basis of the image signal, and transmitting the image beam to a projection lens to project an image; and
   a Digital Micro-mirror Device control module, coupling to the central processing unit and the Digital Micro-mirror Device, and controlling rotation angles of the micro-mirrors on the basis of the image signal;
   wherein the projector circuit board is perpendicular to a light path of the projection lens.

2. The projector circuit board as claimed in claim 1, further comprising a direct current power supply converting module generating a plurality of voltage levels for different components of the projector circuit board.

3. The projector circuit board as claimed in claim 1, wherein the image receiving terminal is implemented by a Video Graphics Array connector.

4. The projector circuit board as claimed in claim 3, further comprising an analog-digital image converter coupling to the Video Graphics Array connector and the central processing unit to convert the image signal received by the Video Graphics Array connector from an analog form to a digital form.

5. The projector circuit board as claimed in claim 1, wherein the image receiving terminal is implemented by a High-Definition Multimedia Interface connector.

6. The projector circuit board as claimed in claim 5, further comprising a digital image signal receiving module coupling to the High-Definition Multimedia Interface connector and the central processing unit to convert the image signal received by the High-Definition Multimedia Interface connector to a specific signal format capable of being processed by the central processing unit.

7. A projector, comprising:
   a light source, providing a light beam;
   a motor;
   a color wheel, rotated by the motor to transform the light beam to a colored beam;
   a projection lens; and a projector circuit board, comprising:
- an image receiving terminal, receiving an image signal;
- a central processing unit, processing the image signal received by the image receiving terminal;
- a motor driving module, driving the motor on the basis of the processed image signal;
- a Digital Micro-mirror Device, comprising a plurality of micro-mirrors, reflecting the colored beam, modulating the colored beam into an image beam on the basis of the image signal, and transmitting the image beam to the projection lens to project an image; and
- a Digital Micro-mirror Device control module, coupling to the central processing unit and the Digital Micro-mirror Device, and controlling rotation angles of the micro-mirrors;

wherein the projector circuit board is perpendicular to a light path of the projection lens.

8. The projector as claimed in claim 7, further comprising a direct current power supply converting module generating a plurality of voltage levels for different components of the projector circuit board.

9. The projector as claimed in claim 7, wherein the image receiving terminal is implemented by a Video Graphics Array connector.

10. The projector as claimed in claim 9, further comprising an analog-digital image converter coupling to the Video Graphics Array connector and the central processing unit to convert the image signal received by the Video Graphics Array connector from an analog form to a digital form.

11. The projector as claimed in claim 7, wherein the image receiving terminal is implemented by a High-Definition Multimedia Interface connector.

12. The projector as claimed in claim 11, further comprising a digital image signal receiving module coupling to the High-Definition Multimedia Interface connector and the central processing unit to convert the image signal received by the High-Definition Multimedia Interface connector to a specific signal format that capable of being processed by the central processing unit.

* * * * *